United States Patent
Wagner

(10) Patent No.: US 10,704,575 B2
(45) Date of Patent: Jul. 7, 2020

(54) MOTOR VEHICLE

(71) Applicant: Bayerische Motoren Werke Aktiengesellschaft, Munich (DE)

(72) Inventor: Thomas Wagner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/784,561

(22) Filed: Oct. 16, 2017

(65) Prior Publication Data

US 2018/0038396 A1 Feb. 8, 2018

Related U.S. Application Data

(63) Continuation of application No. PCT/EP2016/057566, filed on Apr. 7, 2016.

(30) Foreign Application Priority Data

Apr. 7, 2015 (DE) .................. 10 2015 207 037

(51) Int. Cl.
*B60R 19/52* (2006.01)
*F15D 1/12* (2006.01)
*B60K 11/08* (2006.01)

(52) U.S. Cl.
CPC .............. *F15D 1/12* (2013.01); *B60K 11/085* (2013.01); *B60Y 2306/09* (2013.01); *Y02T 10/88* (2013.01)

(58) Field of Classification Search
CPC ......... F15D 1/12; B60K 11/085; B60K 11/08; B60R 19/52
USPC ............ 296/193.1, 180.1; 293/115; 180/68.1
See application file for complete search history.

(56) References Cited

U.S. PATENT DOCUMENTS

| | | | |
|---|---|---|---|
| 6,012,761 A * | 1/2000 | Hellhake | B60K 11/08 293/115 |
| 6,405,819 B1 | 6/2002 | Ohkura et al. | |
| 8,128,158 B1 * | 3/2012 | Davis | B60K 11/08 181/224 |

(Continued)

FOREIGN PATENT DOCUMENTS

| | | |
|---|---|---|
| CN | 201633680 U | 11/2010 |
| DE | 100 12 905 A1 | 9/2001 |

(Continued)

OTHER PUBLICATIONS

German-language Search Report issued in counterpart German Application No. 10 2015 207 037.9 dated Mar. 10, 2016 with partial English-language translation (Fifteen (15) pages).

(Continued)

*Primary Examiner* — Joseph D. Pape
(74) *Attorney, Agent, or Firm* — Crowell & Moring LLP

(57) ABSTRACT

The speed of a motor vehicle causes the production of an air flow which can produce disturbing noises at edges of motor vehicle components. To provide a motor vehicle in which disturbing noises due to the air flow when travelling are avoided, at least one spoiler element is provided, or in that a plurality of spoiler elements are provided. The respectively present number of spoiler elements is formed upstream and/or downstream of at least one existing edge of the particular component acted upon by the air flow. The number of spoiler elements is arranged and/or shaped in such a manner that the air flow striking against the respective spoiler elements is dispersed non-uniformly.

15 Claims, 3 Drawing Sheets

(56) References Cited

U.S. PATENT DOCUMENTS

2012/0049545 A1   3/2012  Davis et al.
2013/0275009 A1  10/2013  Sakai
2014/0273807 A1   9/2014  Frayer, III

FOREIGN PATENT DOCUMENTS

EP           2 233 341 A1   9/2010
GB          2 131 150 A    6/1984
WO    WO 2012/077509 A1  6/2012

OTHER PUBLICATIONS

International Search Report (PCT/ISA/210) issued in PCT Application No. PCT/EP2016/057566 dated Jun. 8, 2016 with English-language translation (Seven (7) pages).

German-language Written Opinion (PCT/ISA/237) issued in PCT/EP2016/057566 dated Jun. 8, 2016 (Five (5) pages).

Hucho-Aerodynamik des Automobils. 6., vollstaending ueberarbeitete und erweiterte Auflage. Wiesbaden: Springer Vieweg, 2013 (8.4 Hauptgeraeuschquellen und Minderungsmoeglichkeiten). pp. 535-545, with partial English translation (Fifteen (15) pages).

Chinese-language Office Action issued in counterpart Chinese Application No. 201680022406.7 dated Jul. 29, 2019 with English translation (16 pages).

Chinese-language Office Action issued in counterpart Chinese Application No. 201680022406.7 dated Jan. 22, 2020 with English translation (eight (8) pages).

\* cited by examiner

MOTOR VEHICLE

CROSS REFERENCE TO RELATED APPLICATIONS

This application is a continuation of PCT International Application No. PCT/EP2016/057566, filed Apr. 7, 2016, which claims priority under 35 U.S.C. § 119 from German Patent Application No. 10 2015 207 037.9, filed Apr. 17, 2015, the entire disclosures of which are herein expressly incorporated by reference.

BACKGROUND AND SUMMARY OF THE INVENTION

The invention relates to a motor vehicle having components which are impinged upon by an air flow, wherein the air flow is created while driving the motor vehicle.

In a motor vehicle disturbing tonal noises can arise as a result of the air flow circulating around or through components, or as a result of the flow of air through gaps, in particular in the forward region of the motor vehicle, respectively, while driving.

In the case of a corresponding sound level of these disturbing noises, the noises can be transmitted all the way into the vehicle interior, thus representing an impediment to the comfortable noise level in the vehicle interior. The disturbing tonal noises can be perceived as a whistling sound.

These disturbing noises are created on sharp edges, for example. Sharp edges can be joint burrs, which for example, are caused by tooling. The intensity of the disturbing tonal noises depends in particular on component-specific tolerances.

It is an object of the invention to provide a motor vehicle in which disturbing noises created by virtue of the air flow while driving are avoided.

This and other objects are achieved by a motor vehicle according to the invention having components which are impinged by an air flow. The air flow is created while driving the motor vehicle. The respective component has at least one so-called sharp edge, that is to say that the edge is not rounded. The edge is configured in particular as a joint burr.

At least one spoiler element is advantageously provided, or a plurality of spoiler elements are advantageously provided. The respective number of spoiler elements present is configured in front of and/or behind at least one edge that is present on the respective component that is impinged by the air flow. The respective number of spoiler elements present adjoins at least one edge that is present on the respective component that is impinged by the air flow. The respective number of spoiler elements is disposed and/or shaped such that the air flow that impacts the respective spoiler element is dispersed in a non-uniform manner.

The arrangement of spoiler elements according to sharp component edges can advantageously be applied when the air flow flows through a gap in which a sharp edge is configured, or when the component around which the air flow circulates is located in a passage opening of a flow duct for supplying cooling air in the region of the front bumper in the forward region of a motor vehicle.

In one advantageous embodiment, the component around which the air flow circulates is a louver or a radiator grill, and/or the component of the motor vehicle according to the invention around which the air flow circulates serves for deflecting the air flow in the passage opening.

The louver advantageously has an encircling frame. Webs are disposed between an upper frame portion and a lower frame portion. Passage openings are present between neighboring webs. The passage openings can be opened or closed by pivotable lamellae.

The webs of the louver in each case advantageously have two side walls which are mutually disposed in a V-shaped manner and are interconnected at one end thereof and at the associated opposite end thereof are mutually spaced apart.

In one advantageous embodiment, the respective side wall in each case has one end face, wherein on the respective end face in each case one external and in each case one internal edge are configured, wherein at least one edge is a sharp edge.

A required number of spoiler elements is configured in each case on in each case one internal face of the respective side wall, so as to adjoin the respective internal edge, the arrangement and/or number and/or geometry of said spoiler elements being chosen such that a non-uniform release of an air flow that circulates around the edges on the end faces of the side walls is performed.

In another advantageous embodiment, a required number of spoiler elements corresponding to the spoiler elements that are provided on the internal face of the respective side wall is configured in each case on in each case one external face of the respective side wall, so as to be in front of the respective external edge. The arrangement and/or number and/or geometry of the spoiler elements being chosen such that a non-uniform release of an air flow that circulates around the edges on the end faces of the side walls is performed.

In one advantageous embodiment, the respective spoiler element in a plan view of the end faces of the side walls is rectangular and in a cross-sectional view is triangular.

The spoiler elements that are configured as protrusions are advantageously disposed at regular spacings or at irregular spacings on the respective internal face of the respective side wall.

Opposite protrusions are advantageously disposed in gaps on the respective internal face of the respective side wall, such that one opposite protrusion points toward an intermediate space between two neighboring protrusions.

In one advantageous embodiment, opposite protrusions are disposed so as to be mutually level in terms of height.

The respective pivotable lamella advantageously has mutually spaced apart lateral portions, wherein in a closed position of the respective pivotable lamella, while forming a gap, an external face of the respective lateral portion of the respective pivotable lamella lies opposite an end face of an associated side wall of a neighboring web.

An air flow that invades the respective gap advantageously impacts the respective number of protrusions present which is configured behind the respective internal edge of the respective end face of the respective side wall.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
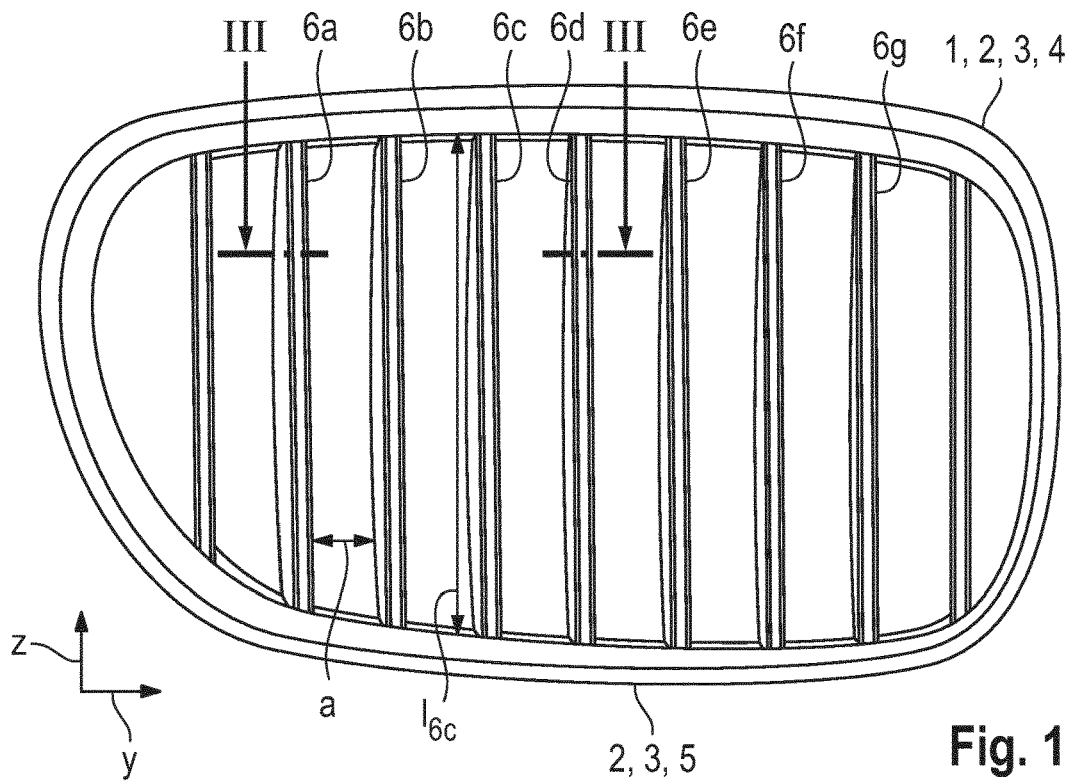
FIG. 1 shows a rear side of a partially illustrated radiator grill, or of a kidney-shaped decorative louver, respectively, in which pivotable lamellae for closing passage openings between webs have been omitted.

As an example of a component of a motor vehicle 1 around which an air flow circulates, FIG. 1 shows a (decorative) louver or a radiator grill 2 which is disposed in front of a radiator (not illustrated) of a motor vehicle 1. The louver 2 has an encircling closed frame 3. Webs 6a to 6g, which in the transverse direction y are mutually spaced apart by a spacing a, are disposed between an upper and a lower frame portion 4 and 5.

Figure 2:
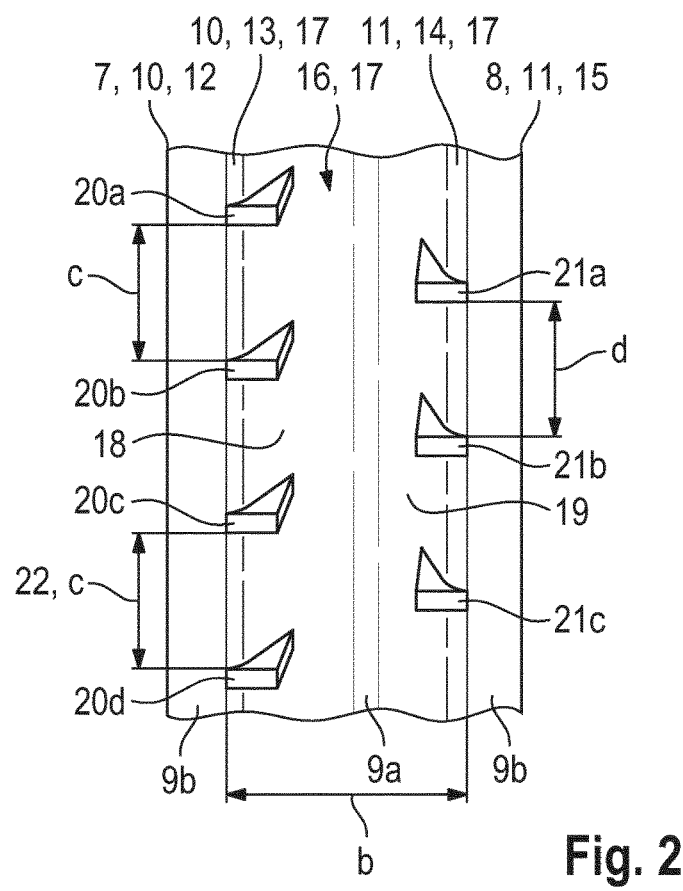
FIG. 2 shows an enlarged illustration of a portion of a web of the louver, from which the arrangement of periodically repeating spoiler elements in each case on an internal periphery of opposite side walls of the web is illustrated.
Figure 3:
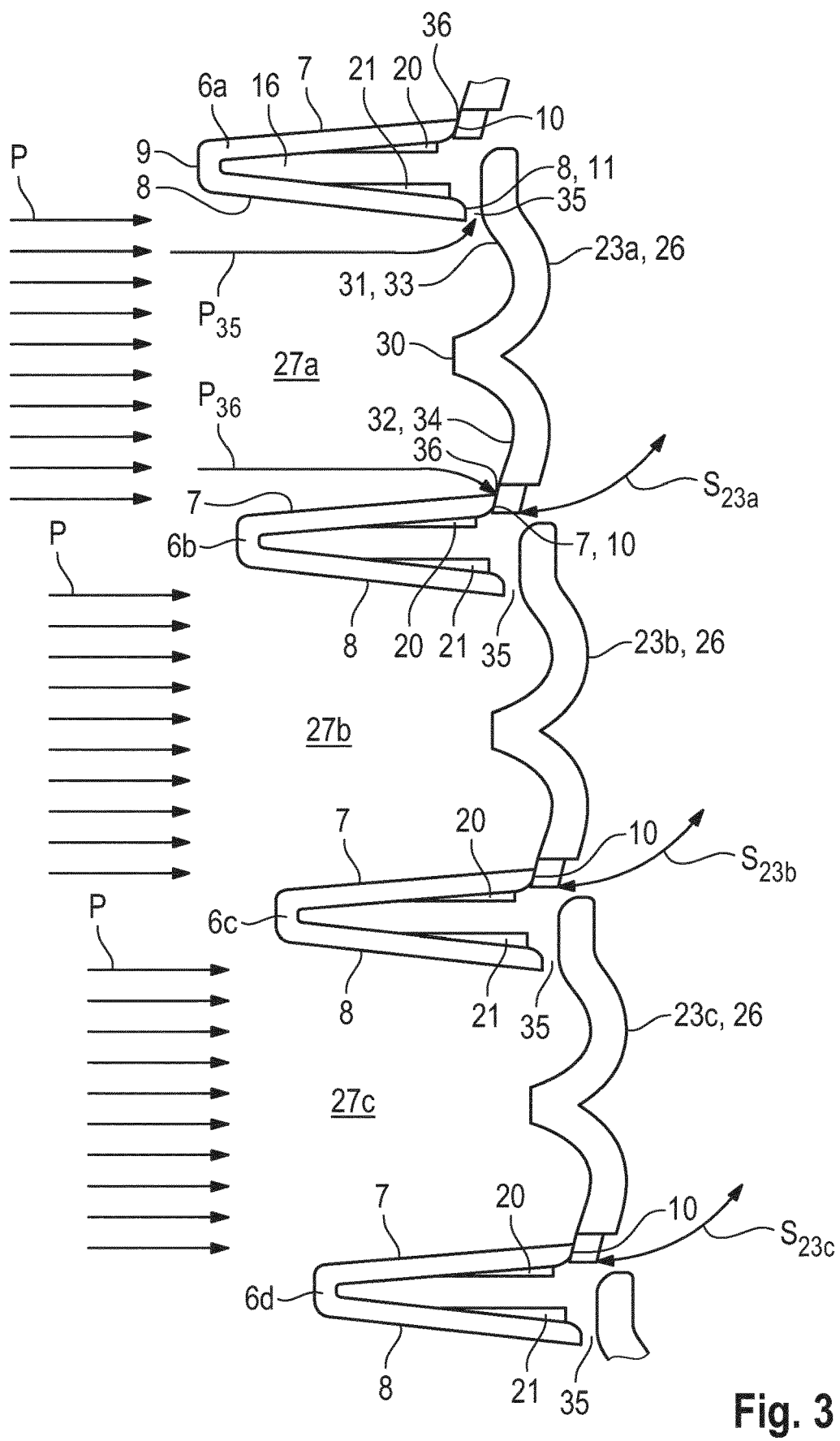
FIG. 3 shows a sectional illustration along the line in FIG. 1, which shows the cross section of four webs and three pivotable lamellae.

The webs 6a to 6g in the embodiment shown have a V-shaped cross section, as can be seen from FIG. 3. Each respective web 6a to 6g is formed by side walls 7 and 8. The side walls 7 and 8 are interconnected at an end 9a of the respective web 6 that faces away from the motor vehicle 1 (points in a forward traveling direction), as is shown in FIGS. 2 and 3. The side walls 7, 8 at an end 9b that faces the motor vehicle 1 (toward a rear of the vehicle) are mutually spaced apart. A cavity 16 having an opening 17 is formed on account thereof.

A respective end face 10, 11 of the respective side wall 7, 8 points toward the motor vehicle 1. In the embodiment shown, the external edge 12 of the end face 10 and the external edge 15 of the end face 11 are sharp-edged, that is to say not rounded. The internal edges 13 and 14 of the end faces 10 and 11 are rounded. The edges 12, 13 and 14, 15 of the end faces 10 and 11 run in a longitudinal direction z of the webs 6.

The internal edge 13 of the end face 10 that is configured toward the cavity 16 is spaced apart from the internal edge 14 of the associated opposite end face 11 by a spacing b. The spacing b is, for example, 5 mm≤b≤20 mm.

As can be derived from the perspective view of FIG. 2 and from the cross-sectional view of FIG. 3, protrusions 20a to 20d and 21a to 21c are configured on the respective mutually facing internal face 18, 19 (e.g., opposing inner sides) of the respective side wall 7, 8, said protrusions 20a to 20d and 21a to 21c serving as spoiler elements.

The respective protrusions 20 and 21 on the internal faces 18, 19 of the side walls 7, 8 are disposed at periodic spacings c and d across the respective length $l_6$. The spacings c and d are between 5 mm≤c, d≤40 mm, for example.

For example, the protrusion 21c in the embodiment shown in FIG. 2 is disposed opposite an intermediate space 22 between the protrusions 20c and 20d. As can be derived from FIGS. 2 and 3, the protrusions 20 and 21 in a cross-sectional view have a triangular shape. The protrusions 20 and 21 in a plan view of the end faces 10, 11 of the side walls 7, 8 are rectangular.

In another embodiment (not illustrated), a required number of spoiler elements corresponding to the spoiler elements 20, 21 which are provided on the internal face 18, 19 of the respective side wall 7, 8 is configured in each case on, in each case, one external face 24, 25 of the respective side wall 7, 8, so as to be in front of the respective external edge 12, 15. The arrangement, number and/or geometry of the spoiler elements is chosen such that a non-uniform release of an air flow that circulates around the edges 12, 13; 14, 15 on the end faces 10, 11 of the side walls 7, 8 is performed.

Additionally, pivotable lamellae 23a, 23b, 23c are illustrated in the cross-sectional view of FIG. 3 along the section line in FIG. 1. The pivotable lamellae 23a, 23b, 23c in the position 26 shown in FIG. 3 are located in a closed position. The lamellae 23a, 23b, 23c in the closed position 26 each close one passage opening 27a, 27b, 27c. The respective passage opening 27a, 27b, 27c is configured between the respective webs 6a, 6b, 6c and 6d that are illustrated in FIG. 3.

The lamellae 23a, 23b, 23c in the cross-sectional view of FIG. 3 have a W-shaped cross section. In the embodiment shown, a web 30 that points away from the motor vehicle 1 is configured in the center of the respective lamella 23a, 23b, 23c. In another embodiment, the respective lamella 23 can have a rectangular or any other suitable shape.

Lateral portions 31, 32 adjoin the respective web 30 of the respective lamellae 23a, 23b, 23c. In the closed position 26 of the respective lamella 23a, 23b, 23c, an external face 33 of the lateral portion 31 that faces away from the motor vehicle 1 lies opposite an end face 11 of the respective side wall 8 of the respective web 6a to 6d. Accordingly, an external face 34 of the lateral portion 32 that faces away from the motor vehicle 1 lies opposite an end face 10 of the respective side wall 7 of the respective web 6a to 6d.

As can be derived from FIG. 3, a gap 35 exists in each case between the end face 11 of the side wall 8 of the respective web 6 and the lateral portion 31 of the respective lamella 23. A corresponding gap 36 is configured between the end face 10 of the respective side wall 7 of the respective web 6 and the associated opposite external face 34 of the respective lateral portion 32 of the respective lamella 23.

Arrows P which symbolize the air flow which impacts the louver 2 when the motor vehicle 1 is being driven are furthermore indicated in FIG. 3. As is illustrated in each case by one arrow P35 and P36, air flows into the respective gap 35 and 36. On account of the respective protrusions 20, 21 that are configured as spoiler elements a non-uniform release of the air flow arises. A disturbing noise is prevented on account thereof.

Arrows $S_{23a}$, $S_{23b}$, and $S_{23c}$ which symbolize the pivoting movement of the respective lamella 23a, 23b, 23c from the closed position 26 to an open position (not illustrated) that is rotated by approx. 90° are furthermore indicated in FIG. 3.

Figure 4:
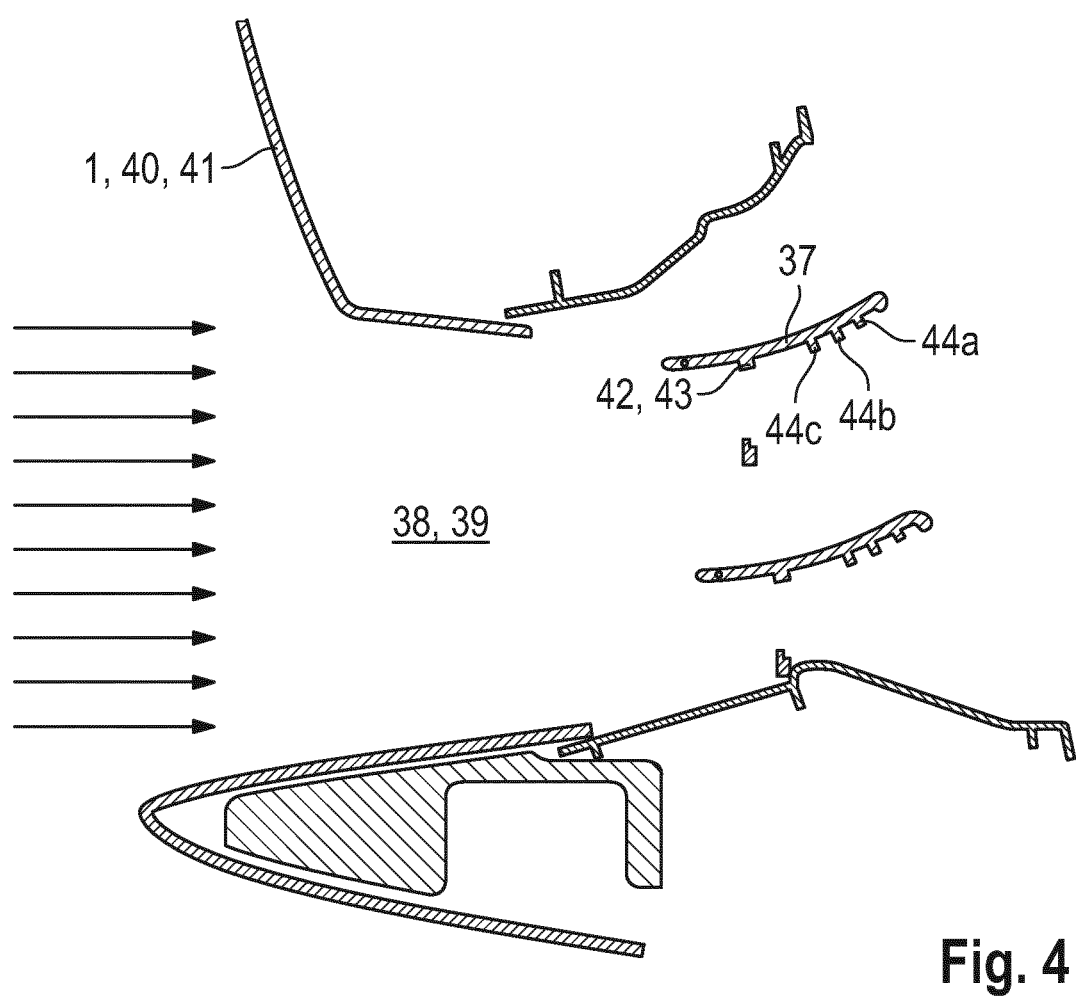
FIG. 4 shows a sectional illustration of a component around which an air flow circulates and which is located in a passage opening of a flow duct in the region of the front bumper in the forward region of a motor vehicle.

FIG. 4 shows a sectional illustration of a component 37 around which an air flow circulates and which is located in a passage opening 38 of a flow duct 39 in the region of the front bumper 41 in the forward region 40 of a motor vehicle 1. A sharp edge 43 is configured on a protrusion 42 on the component 37. Further protrusions 44a, 44b, 44c which as spoiler elements serve for a non-uniform release of the air flow are configured in the flow direction toward the motor vehicle 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
a component impinged upon by an air flow created while driving the motor vehicle, the component having at least one non-rounded sharp edge;
one or more spoiler elements that are formed on each opposing inner sides of the component, wherein the one or more spoiler elements present are formed upstream and/or downstream of at least one edge of the component impinged upon by the air flow, and
wherein the one or more spoiler elements are arranged and/or shaped such that air flow impacting a respective spoiler element is dispersed in a non-uniform manner.

2. The motor vehicle as claimed in claim 1, wherein the sharp edge is configured as a joint burr.

3. The motor vehicle as claimed in claim 1, wherein
the air flow flows through a gap that is defined at least in part by the at least one sharp edge, or
the component around which the air flow circulates is located in a passage opening of a flow duct for supplying cooling air in a region of a front bumper in a forward region of the motor vehicle.

4. The motor vehicle as claimed in claim 1, wherein the component around which the air flow circulates is a louver or a radiator grill.

5. The motor vehicle as claimed in claim 3, wherein the component around which the air flow circulates serves to deflect the air flow in the passage opening.

6. The motor vehicle as claimed in claim 4, wherein
the louver has an encircling frame and webs,
the webs are disposed between an upper frame portion and a lower frame portion of the louver,
passage openings are present between neighboring webs, and
the passage openings are openable or closable by pivotable lamellae.

7. The motor vehicle as claimed in claim 6, wherein the webs of the louver in each case have two side walls which are mutually disposed in a V-shaped manner and are interconnected at one end thereof, and at an associated opposite end thereof are mutually spaced apart.

8. The motor vehicle as claimed in claim 7, wherein
each respective side wall has one end face,
the respective end faces in each case have one external and in each case one internal edge, and
the one external edge is the sharp edge.

9. The motor vehicle as claimed in claim 8, wherein
a number of the one or more spoiler elements is configured on, in each case, an internal face of each respective side wall, so as to adjoin the respective internal edge, and
an arrangement, number and/or geometry of the one or more spoiler elements are chosen such that an air flow that circulates around the edges on the end faces of the side walls is non-uniformly released.

10. The motor vehicle as claimed in claim 9, wherein
the number of the one or more spoiler elements corresponding to the one or more spoiler elements on the internal face of each respective side wall is configured on, in each case, one external face of the respective side wall, so as to adjoin the respective external edge, and
the arrangement, number and/or geometry of the one or more spoiler elements are chosen such that a non-uniform release of an air flow that circulates around the edges on the end faces of the side walls is performed.

11. The motor vehicle as claimed in claim 9, wherein each spoiler element in a plan view of the end faces of the side walls is rectangular and, in a cross-sectional view, is triangular.

12. The motor vehicle as claimed in claim 9, wherein the one or more spoiler elements are configured as protrusions and are disposed at regular spacings or at irregular spacings on the internal face of the side wall.

13. The motor vehicle as claimed in claim 12, wherein
opposite protrusions are disposed in gaps in the respective internal face of the respective side wall, such that an opposite protrusion is positioned an intermediate space between two neighboring protrusions, or,
protrusions that are opposite to one another are disposed so as to be mutually level in terms of height.

14. The motor vehicle as claimed in claim 8, wherein
the pivotable lamella have mutually spaced apart lateral portions, and
in a closed position of the pivotable lamella, while forming a gap, an external face of the respective lateral portion of the pivotable lamella lies opposite an end face of an associated side wall of a neighboring web.

15. The motor vehicle as claimed in claim 14, wherein an air flow that invades the gap impacts a number of protrusions present which is configured behind the one internal edge of the end face of the associated side wall.

* * * * *